(12) United States Patent
Thorn

(10) Patent No.: US 8,482,403 B2
(45) Date of Patent: *Jul. 9, 2013

(54) INTERACTING WITH DEVICES BASED ON PHYSICAL DEVICE-TO-DEVICE CONTACT

(75) Inventor: Ola Karl Thorn, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1264 days.

This patent is subject to a terminal disclaimer.

(21) Appl. No.: 11/972,712

(22) Filed: Jan. 11, 2008

(65) Prior Publication Data

US 2009/0153342 A1 Jun. 18, 2009

Related U.S. Application Data

(60) Provisional application No. 61/013,180, filed on Dec. 12, 2007.

(51) Int. Cl.
| | |
|---|---|
| *G08B 1/00* | (2006.01) |
| *G08B 7/00* | (2006.01) |
| *H04B 1/00* | (2006.01) |
| *H04M 3/42* | (2006.01) |

(52) U.S. Cl.
USPC .................. 340/539.11; 340/568.1; 340/500; 340/506; 455/70; 455/414.2; 455/41.2; 455/517

(58) Field of Classification Search
USPC ..................................... 340/539.11
See application file for complete search history.

(56) References Cited

U.S. PATENT DOCUMENTS

| 7,634,341 | B2* | 12/2009 | Patchell ........................ 701/45 |
| 2004/0192383 | A1* | 9/2004 | Zacks et al. .................... 455/557 |
| 2004/0203381 | A1* | 10/2004 | Cahn et al. .................... 455/41.2 |
| 2006/0256074 | A1 | 11/2006 | Krum et al. |
| 2007/0026797 | A1* | 2/2007 | Borjeson et al. ............. 455/41.2 |
| 2007/0124503 | A1* | 5/2007 | Ramos et al. ................. 709/248 |
| 2007/0188323 | A1* | 8/2007 | Sinclair et al. ............. 340/568.1 |
| 2009/0215397 | A1 | 8/2009 | Thorn et al. |

FOREIGN PATENT DOCUMENTS

| WO | WO 2004/062131 A1 | 7/2004 |
| WO | WO 2005/076542 A1 | 8/2005 |
| WO | WO 2007/034457 A1 | 3/2007 |
| WO | WO 2009-074887 A1 | 6/2009 |

OTHER PUBLICATIONS

International Search Report and Written Opinion mailed on Sep. 10, 2008 issued in corresponding application No. PCT/IB2008/051132, 12 pages.

(Continued)

*Primary Examiner* — Jennifer Mehmood
*Assistant Examiner* — Fekadeselassie Girma
(74) *Attorney, Agent, or Firm* — Snyder, Clark, Lesch & Chung, LLP

(57) ABSTRACT

A first device may receive a signal from a sensor coupled to the first device, determine whether the first device is tapped one or more times against a second device, send a message to the second device when it is determined that the first device has been tapped one or more times against the second device, determine if the one or more taps are valid user input based on a response from the second device, and perform an application specific action when the one or more taps are valid user input.

20 Claims, 13 Drawing Sheets

OTHER PUBLICATIONS

Notification of Transmittal of the International Search Report and the Written Opinion for the International Searching Authority, or the Declaration, corresponding to PCT/IB2009/051936, mailed Jan. 25, 2010, 13 pages.

Co-pending U.S. Appl. No. 12/463,895, filed May 11, 2009 entitled "Communication Between Devices Based on Device-To-Device Physical Contact", Ola Karl Thorn et al.

* cited by examiner

INTERACTING WITH DEVICES BASED ON PHYSICAL DEVICE-TO-DEVICE CONTACT

CROSS REFERENCE TO A RELATED APPLICATION

This application claims priority under 35 U.S.C. §119 based on U.S. provisional application No. 61/013,180, filed Dec. 12, 2007, the disclosure of which is hereby incorporated by reference herein its entirety.

BACKGROUND

Many computer or communication devices rely on a keyboard or a keypad to provide part of a user interface. However, using the keyboard or keypad is often cumbersome and/or inconvenient. In addition, other devices that use touch screens to emulate a keyboard or a keypad may not provide significant improvements over devices that use a keyboard or a keypad.

SUMMARY

According to one aspect, a method may include receiving a signal from a sensor coupled to a first device, determining whether the first device is tapped one or more times against a second device, sending a message to the second device when it is determined that the first device has been tapped one or more times against the second device, determining if the one or more taps are valid user input based on a response from the second device, and performing an application specific action when the one or more taps are valid user input.

Additionally, receiving a signal may include receiving the signal from an accelerometer.

Additionally, determining whether the first device is tapped one or more times against the second device may include determining whether samples of the signal match a predetermined acceleration pattern.

Additionally, sending a message may include obtaining parameters regarding the one or more taps, and sending the parameters to the second device.

Additionally, obtaining parameters may include obtaining locations of the one or more taps on a surface of the first device, determining time between two consecutive taps, or determining time of occurrence of at least one of the one or more taps.

Additionally, determining if the one or more taps are valid user input may include receiving the response, the response indicating whether the sent parameters match parameters that are obtained from one or more taps on the second device.

Additionally, determining if the one or more taps are valid user input may include receiving parameters associated with one or more taps on the second device in response to the message, determining if the received parameters match parameters that are extracted from the signal when the first device is tapped one or more times against the second device, and determining whether the one or more taps are valid by comparing the received parameters to the extracted parameters.

Additionally, performing an application specific action may include coordinating at least one of an audio task or a visual task with the second device.

Additionally, performing an application specific action include may include one of sending an audio signal to the second device for output by a speaker, or sending a video signal to the second device for display.

Additionally, performing an application specific action may include at least one of receiving personal contact information from the second device, conducting a commercial transaction with the second device, or receiving a video clip, audio clip, image, or text from the second device.

According to another aspect, a device may include a sensor and a processor. The processor may be configured to receive a signal from the sensor, detect taps based on the signal, extract parameters that are associated with the detected taps, send a request to a second device to verify if the extracted parameters match parameters that correspond to taps on the second device, determine if the detected taps are valid user input based on a response from the second device, and interact with the second device over a communication channel when the taps are valid user input.

Additionally, the parameters may include at least one of time between consecutive taps, or time of occurrence of a tap.

Additionally, the sensor may include at least one of an accelerometer, or an electric field sensor.

Additionally, the second device may include at least one of a cell phone with a display or a speaker, a headset, or a laptop.

Additionally, the device may include a cell phone.

Additionally, the communication channel may include a Bluetooth communication channel.

Additionally, the request may include the extracted parameters and the response may include information that indicates whether the extracted parameters match parameters that correspond to taps on the second device.

Additionally, the response may include parameters that are obtained from taps by the second device.

According to yet another aspect, a device may include means for sensing an acceleration of the device and outputting acceleration values, means for receiving the acceleration values from the means for sensing the acceleration, means for detecting taps that are produced by a first device and a second device based on the acceleration values, means for sending a message to the second device when the taps are detected, means for determining if the detected taps are valid user input based on a response from the second device, and means for interacting with the second device when the taps are valid user input.

Additionally, the message may include time of occurrence of at least one of the detected taps.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION OF EMBODIMENTS

The following detailed description refers to the accompanying drawings. The same reference numbers in different drawings may identify the same or similar elements. The terms "tap," "knock," and "touch" are interchangeably used herein and they may refer to an impact or a contact an object makes against another object. The impact may cause sufficient change in momentum in the body to allow a sensor, such as an accelerometer, to detect the change. Alternatively, the touch may cause a sensor, such as an electric field sensor, a surface conduction sensor, a pressure/force sensor, etc., to detect a surface contact against another surface.

In implementations described herein, a device (e.g., a portable phone) may establish a communication link with another device after a user taps the device against the other device. When a user taps the device against the other device, the device may detect the taps and obtain a pattern from the taps. Depending on the pattern, the device and the other device may interact with one another over a communication link. Having devices that communicate/interact with other devices based on taps may be convenient, safe, and/or economical (e.g., no need to navigate through a menu system to communicate/interact with another device, no need to expend energy on having a communication link until taps are detected, or expose the link to spam, virus, and/or other unwanted network data, etc.).

Figure 1A:
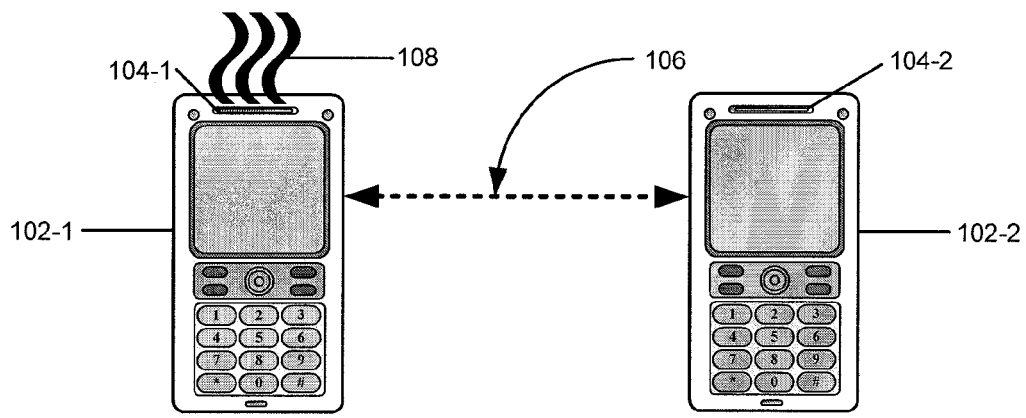
FIGS. 1A through 1C illustrate a use of exemplary devices in which concepts described herein may be implemented.
Figure 1B:
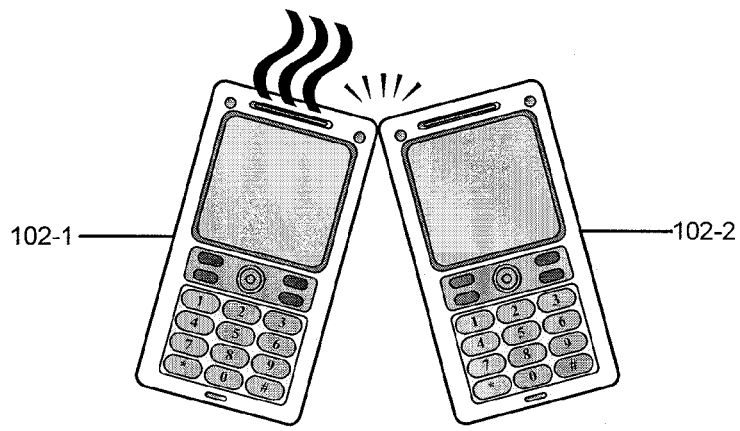
Figure 1C:
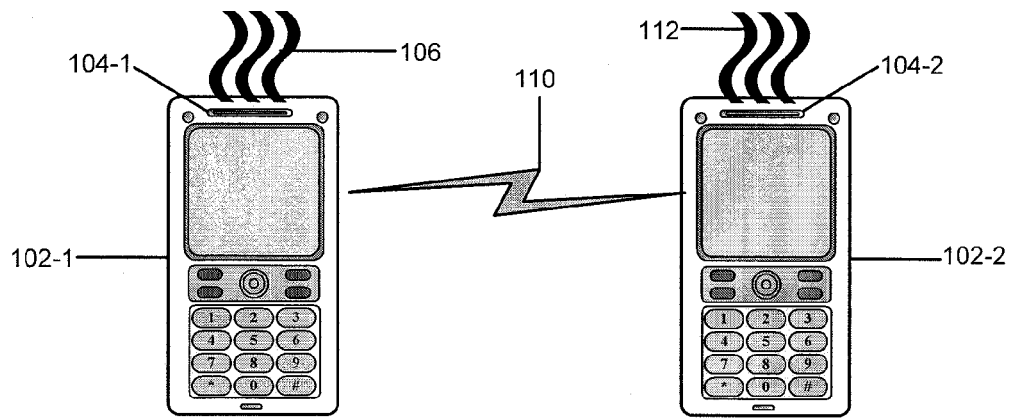

FIGS. 1A through 1C illustrate an example of the above concept. FIGS. 1A through 1C show devices 102-1 and 102-2 (e.g., cell phone). Device 102-1 and device 102-2 may include speaker 104-1 and 104-2, respectively. In addition, each of devices 102-1 and 102-2 may sense presence of one another through a discovery link 106. Assume that, in the example, device 102-1 is playing a song and generating sound waves 108 via speaker 104-1.

When a user taps device 102-2 into device 102-1 (or vice versa), both devices 102-1 and 102-2 may sense the taps and compare the taps to a particular pattern. FIG. 1B shows device 102-2 being tapped with device 102-1.

As further shown in FIG. 1C, upon determining that the pattern represents user input to play the song on both devices 102-1 and 102-2, devices 102-1 and 102-2 may establish a communication link 110. Through communication link 110, device 102-1 may transmit signals on one of two audio channels for stereo sound to device 102-2. Consequently, devices 102-1 and 102-2 may output stereo sound signals to speakers 104-1 and 104-2, which then output sound waves 112 and 114, respectively.

Exemplary Network and Device

Figure 2:
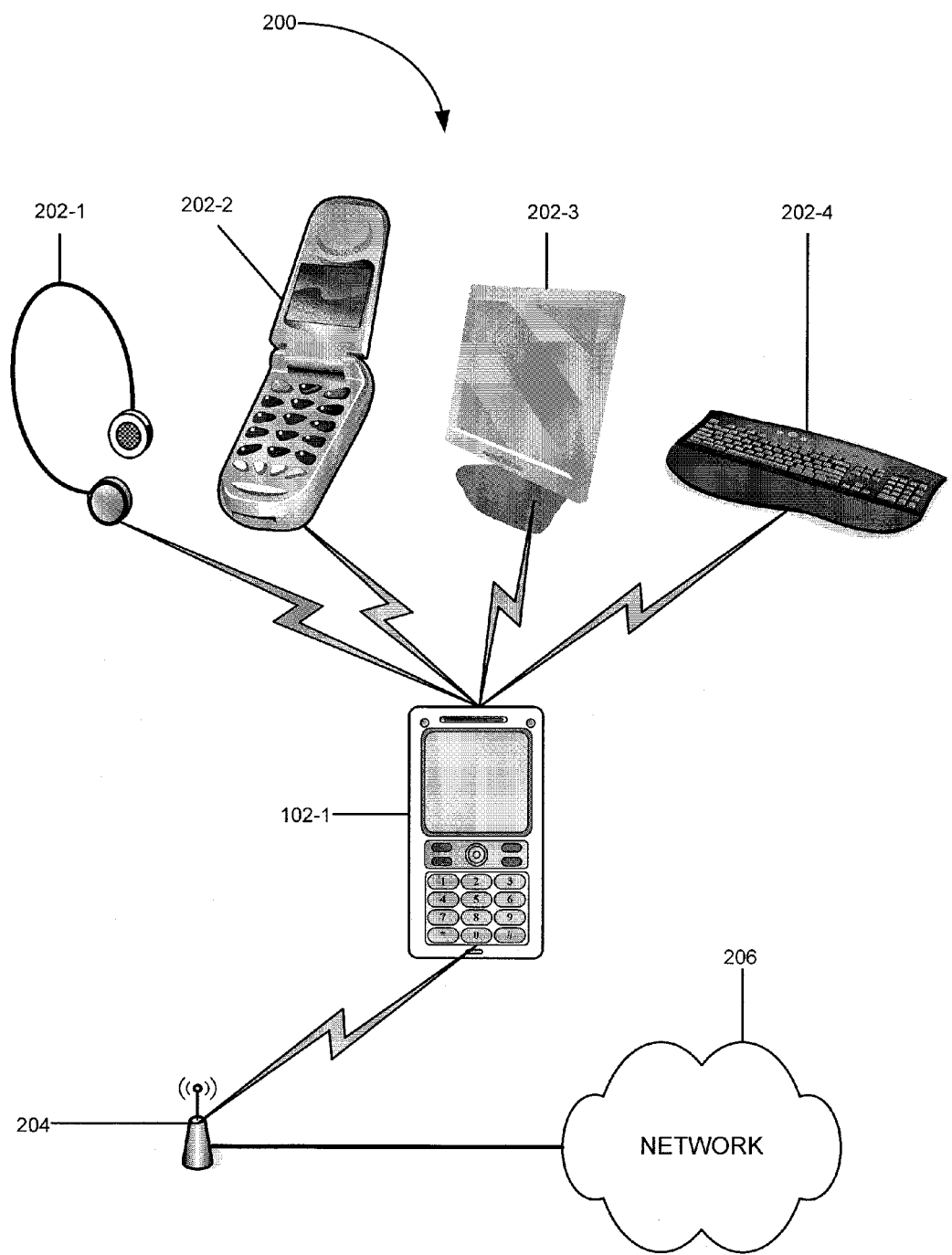
FIG. 2 shows an exemplary network in which concepts described herein may be implemented.

FIG. 2 shows an exemplary network 200 in which concepts described herein may be implemented. As shown, network 200 may include device 102-1, a headset 202-1, a cell phone 202-2, a display 202-3, a keyboard 202-4, wireless access point (WAP) 204, and network 206. In addition, depending on implementation, network 200 may include fewer, additional, or different devices than the ones illustrated in FIG. 2. For example, network 200 may include mobile devices (e.g., a wireless mouse, a mobile telephone accessory, a gaming device, a wearable computing device (e.g., watch), a GPS receiver, a television, etc.), or stationary devices (e.g., a copier machine, a television, etc.) that can communicate with device 102-1 or with each other.

Device 102-1 may include any of the following devices that have the ability to or are adapted to communicate and interact with another device in close range, such as a radio telephone or a mobile telephone with ultra wide band (UWB) communication capability or Bluetooth capability; a game console or device; a global positioning system (GPS) receiver; a personal communications system (PCS) terminal that may combine a cellular radiotelephone with, data processing, facsimile, and/or data communications capabilities; a wearable computing devices (e.g., calculator-watch); an electronic notepad, a laptop, and/or a personal computer that communicate with wireless peripherals (e.g., a wireless keyboard, speakers, mouse, etc.); a personal digital assistant (PDA) that can include a telephone; or another type of computational or communication device.

Each of devices 202-1 through 202-4 may include one or more devices that are capable of communicating and/or interacting wirelessly with device 102-1 via, for example, Bluetooth, Wireless Fidelity (Wi-Fi), etc. More specifically, headset 202-1 may receive audio information from device 102-1 and output sound (e.g., songs). Cell-phone 202-2 may perform various functions for device 102-1, such as providing an audio output device, display, microphone, etc. In one implementation, cell-phone 202-2 may be similarly or identically constructed as device 102-1. Display 202-3 may show images that are received by device 102-1 and/or may send information that is inputted via a touch-sensitive screen to device 102-1. Keyboard 202-4 may permit a user to conveniently input alphanumeric and special characters to device 102-1.

WAP 204 may include a device for accessing network 206, such as a router that is able to receive and transmit wireless and/or wired signals, or any other device that provides access to a network. WAP 204 may communicate with device 102-1 using a wireless communication protocol.

Network 206 may include the Internet, an ad hoc network, a local area network (LAN), a wide area network (WAN), a metropolitan area network (MAN), a cellular network, a public switched telephone network (PSTN), an intranet, any other network, or a combination of networks.

Figures 3A, 3B:
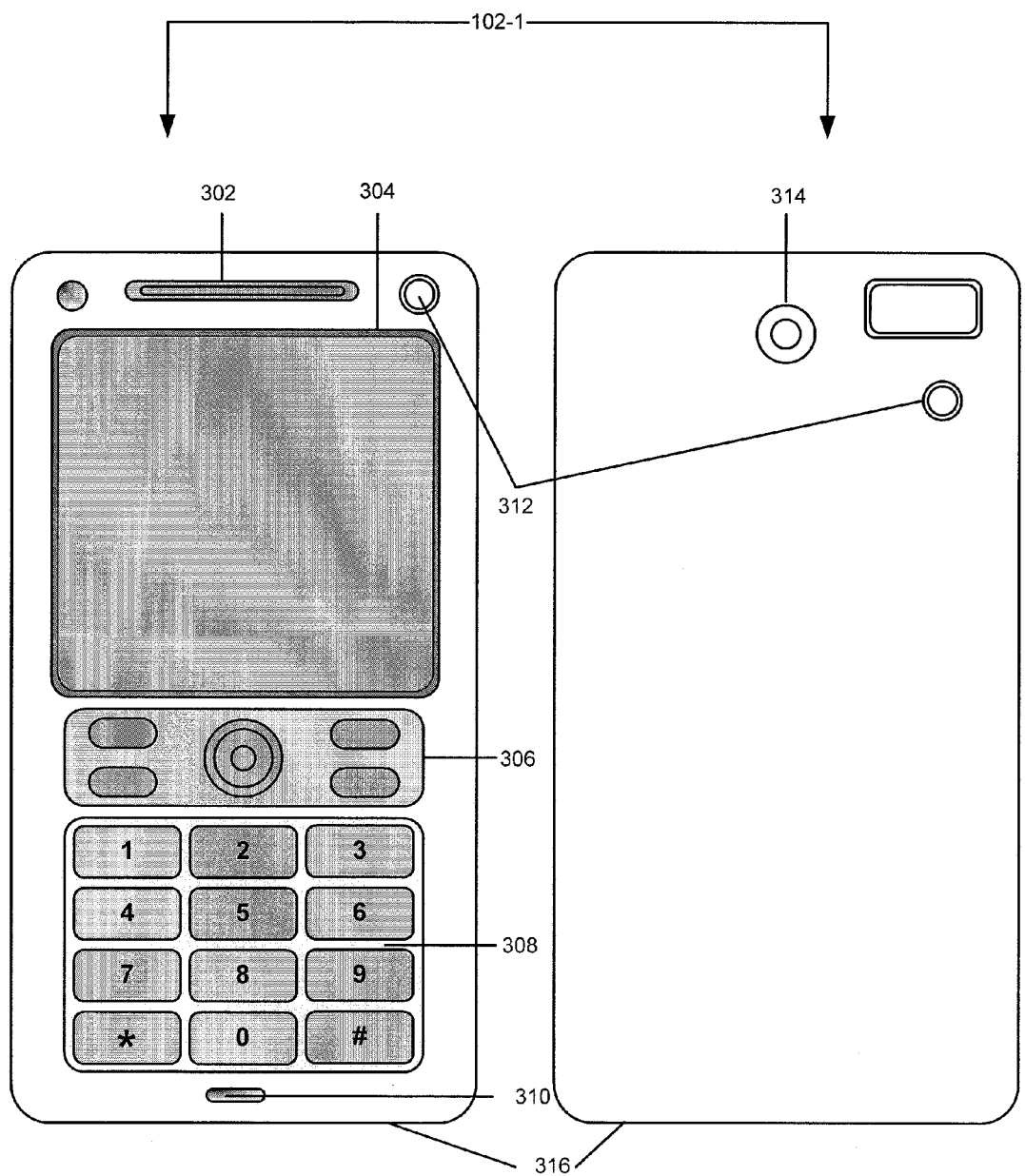
FIGS. 3A and 3B are front and rear views of an exemplary device of FIG. 2.

FIGS. 3A and 3B are front and rear views, respectively, of an exemplary device 102-1 in which concepts described herein may be implemented. In this implementation, device 102-1 may take the form of a portable phone (e.g., a cell phone). As shown in FIGS. 3A and 3B, device 102-1 may include a speaker 302, a display 304, control buttons 306, a keypad 308, a microphone 310, sensors 312, a lens assembly 314, and housing 316. Speaker 302 may provide audible information to a user of device 102-1. Display 304 may provide visual information to the user, such as an image of a caller, video images, or pictures. Control buttons 306 may permit the user to interact with device 102-1 to cause device 102-1 to perform one or more operations, such as place or receive a telephone call. Keypad 308 may include a standard telephone keypad. Microphone 310 may receive audible information from the user. Sensors 312 may collect and provide, to device 102-1, information (e.g., acoustic, infrared, etc.) that is used to aid the user in capturing images. Lens assembly 312 may include a device for manipulating light rays from a given or a selected range, so that images in the range can be captured in a desired manner. Housing 316 may provide a casing for components of device 102-1 and may protect the components from outside elements.

Figure 4:
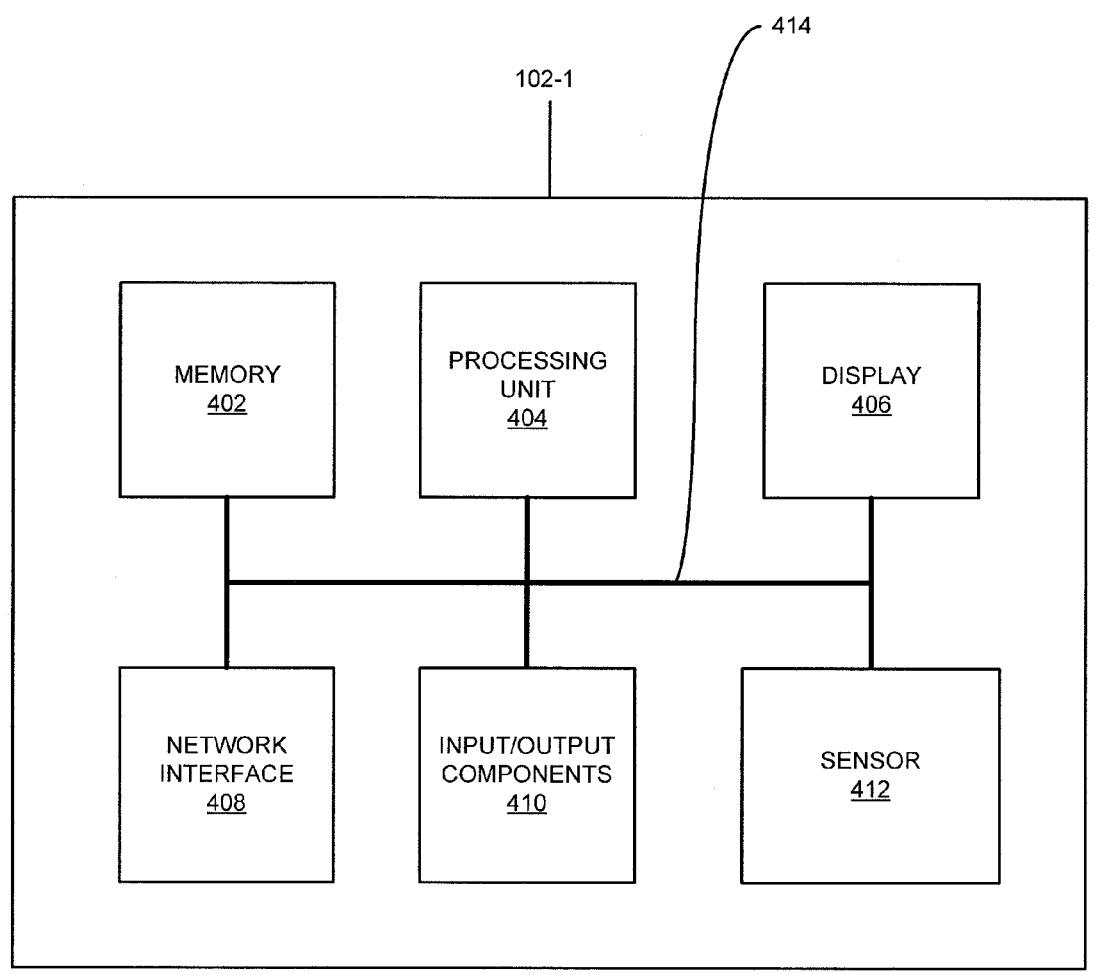
FIG. 4 is a block diagram of the exemplary device of FIGS. 3A and 3B.

FIG. 4 is a block diagram of exemplary components of device 102-1. The term "component," as used herein, may refer to hardware component, a software component, or a combination of the two. As shown, device 102-1 may include a memory 402, processing unit 404, display 406, network interface 408, input/output components 410, sensor 412, and communication path(s) 414. In other implementations, device 102-1 may include more, fewer, or different components.

Memory 402 may include static memory, such as read only memory (ROM), and/or dynamic memory, such as random access memory (RAM), or onboard cache, for storing data and machine-readable instructions. Memory 402 may also include storage devices, such as a floppy disk, CD ROM, CD read/write (R/W) disc, and/or flash memory, as well as other types of storage devices. Processing unit 404 may include a processor, a microprocessor, an Application Specific Integrated Circuit (ASIC), a Field Programmable Gate Array (FPGA), and/or other processing logic capable of controlling device 102-1.

Display 406 may include a component that can display signals generated by device 102-1 as images on a screen and/or that can accept inputs in the form of taps or touches on the screen. For example, display 406 may provide a graphical user interface through which user can interface with device 102-1 to display images or to play music. Examples of display 406 include a liquid crystal display (LCD), organic light-emitting diode (OLED) display, bistable display, and/or a touch screen.

Network interface 408 may include any transceiver-like mechanism that enables device 102-1 to communicate with other devices and/or systems. For example, network interface 408 may include mechanisms for communicating via a network, such as the Internet, a terrestrial wireless network (e.g., wireless local area network (WLAN)), a satellite-based network, a WPAN, etc. Additionally or alternatively, network interface 408 may include a modem, an Ethernet interface to a local area network (LAN), and/or an interface/connection for connecting device 102-1 to other devices (e.g., a Bluetooth interface). Further, network interface 408 may include one or more receivers, such as a Global Positioning System (GPS) or Beidou Navigation System (BNS) receiver for determining its own geographical location. Input/output components 410 may include a keypad (e.g., keypad 308 of FIG. 2), a button (e.g., control buttons 306), a mouse, a speaker (e.g., speaker 302), a microphone (e.g., microphone 310), a Digital Video Disk (DVD) writer, a DVD reader, Universal Serial Bus (USB) lines, and/or other types of devices for converting physical events or phenomena to and/or from digital signals that pertain to device 102-1.

Sensor 412 may include an accelerometer and/or a contact-sensitive sensor (e.g., an electric field sensor, a surface conduction sensor, a pressure/force sensor, etc.). The accelerometer may include hardware and/or software for determining acceleration of device 102-1. An example of accelerometer may include a micro electro mechanical system (MEMS) accelerometer or a piezoelectric accelerometer that is coupled to the device housing for measuring device acceleration in one, two, or three axes. In one implementation, when the accelerometer detects acceleration, the accelerometer may output its measurement as three separate values, each of which represents the magnitude of an acceleration component that is parallel to one of coordinate axis. In one implementation, the outputs of the accelerometer may be used to determine taps on the surface of housing 316 of device 102-1.

The contact-sensitive sensor may include hardware and/or software for determining contacts, such as an electric field sensor, a surface conduction sensor, a pressure/force sensor, etc. In one implementation, an electric field sensor or a surface conduction sensor may determine the location of a nearby object or a touching object having a conductive surface. The electric field/surface conduction sensor may generate an electric field or a current at the surface of housing 316, and may detect changes in its capacitance, electric field, and/or impedance of current paths when the object is close to or is in contact with device 102-1. In a different implementation, instead of covering most of the surface of housing 316 (e.g., a top corner portion of device 102-1), the electric field/surface conduction sensor may cover only a small portion of housing 316 that may physically contact or touch another device. In still other implementations, different types of contact-sensitive sensors, such as a vibration sensitive sensor based on piezoelectric material may be used to detect taps, a pressure/force sensor to detect force corresponding to taps, etc.

Communication path 412 may provide an interface through which components of device 102-1 can communicate with one another.

Figure 5:
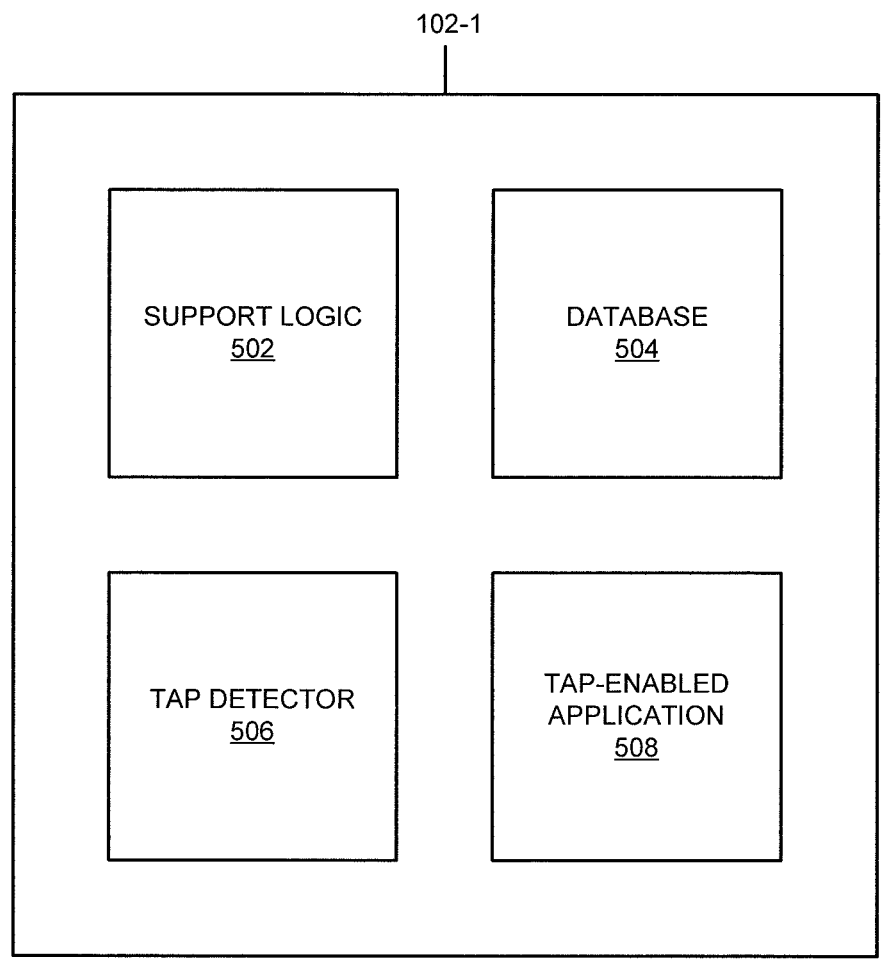
FIG. 5 is a functional block diagram of the exemplary device of FIGS. 3A and 3B.

FIG. 5 is a functional block diagram of device 102-1. As shown, device 102-1 may include support logic 502, a database 504, a tap detector 506, and a tap-enabled application 508. Depending on the particular implementation, device 102-1 may include fewer, additional, or different types of functional blocks than those illustrated in FIG. 5.

Support logic 502 may be included in processing unit 404 and/or memory 402, and may include hardware and/or software for performing various support functions for other components in FIG. 5 (e.g., database 504, a tap detector 506, etc.). For example, support logic 502 may provide a Transmission Control Protocol (TCP)/Internet Protocol (IP) stack to support communications between tap-enabled applications 508 on different devices.

Database 504 may be included in memory 402 (FIG. 4) and may act as an information repository for the components of device 102-1. For example, in one implementation, database 504 may store data that may be used to identify tap patterns that are obtained from processing unit 404 and/or sensor 412. As an example, a tap pattern may correspond to two taps in a relatively short period of time (e.g., one second).

In some implementations, a user may associate a specific tap pattern (e.g., a tap pattern that has 3 taps) with an application and store the association in database 504. For example, 3 taps may be associated with an application for sharing music between different devices, 2 taps may be associated with sharing a picture, etc.

Tap detector 506 may include a component for detecting a particular tap pattern based on inputs from sensor 412. For example, tap detector 506 may determine acceleration of device 102-1 as a function of time based on outputs of sensor 412, and may obtain a pattern of taps from the acceleration. Tap detector 506 may compare the obtained pattern against stored patterns in database 504. If tap detector 506 finds a match, tap detector 506 may convey that device 102-1 has detected valid user input to another component in device 102-1, such as tap-enabled application 508. In a different implementation, when tap detector 506 obtains a pattern of taps, tap detector 506 may notify a nearby device about the pattern. The nearby device may compare the pattern against a pattern that the nearby device has detected, and if there is a match, may convey that the valid user input has been detected to tap-enabled application 508 on device 102-1.

In some implementation, when tap-detector 506 determines that the valid user input is detected, tap-detector 506 may convey the detected pattern to a specific tap-enabled application 508. For example, if 3 taps are detected, tap-detector 506 may start a music sharing application and convey the information to the music sharing tap-enabled application 508; if 2 taps are detected, tap detector 506 may start an image sharing tap-enabled application 508, etc. As explained above with respect to database 504, a user may configure which pattern is associated with which application.

Tap-enabled application 508 may include a component for receiving an output from tap detector 506 (e.g., an indication that valid input is detected). In addition, tap-enabled application 508 may initiate a communication with another device with which device 102-1 has been tapped, and may interact with the other device. For instance, in the example illustrated in FIG. 1A through FIG. 1C, tap-enabled application 508 in device 102-1 may cause each of speakers 104-1 and 104-2 in device 102-1 and device 102-2 to output each of two channels of stereo audio signals.

Examples of different types of tap-enabled application 508 may include: an application for transferring a piece of information (e.g., an electronic payment, coupon, contact information, image, piece of music, text, etc.) between two devices that have been tapped against one another; an application for sharing a task between the devices (e.g., outputting stereo audio signal to different speakers on different devices); an application for selecting a particular device that has been tapped as an input/output device (e.g., a wireless display or keyboard), etc. If a tap-enabled application 508 is implemented to share a file with another application in a different device, tap-enabled application 508 may determine how to layout a picture, video, text, web document, and/or other media content across multiple screens.

In some implementations, the functionalities of tap detector 506 may be incorporated in tap/enabled application 508.

Figure 6:
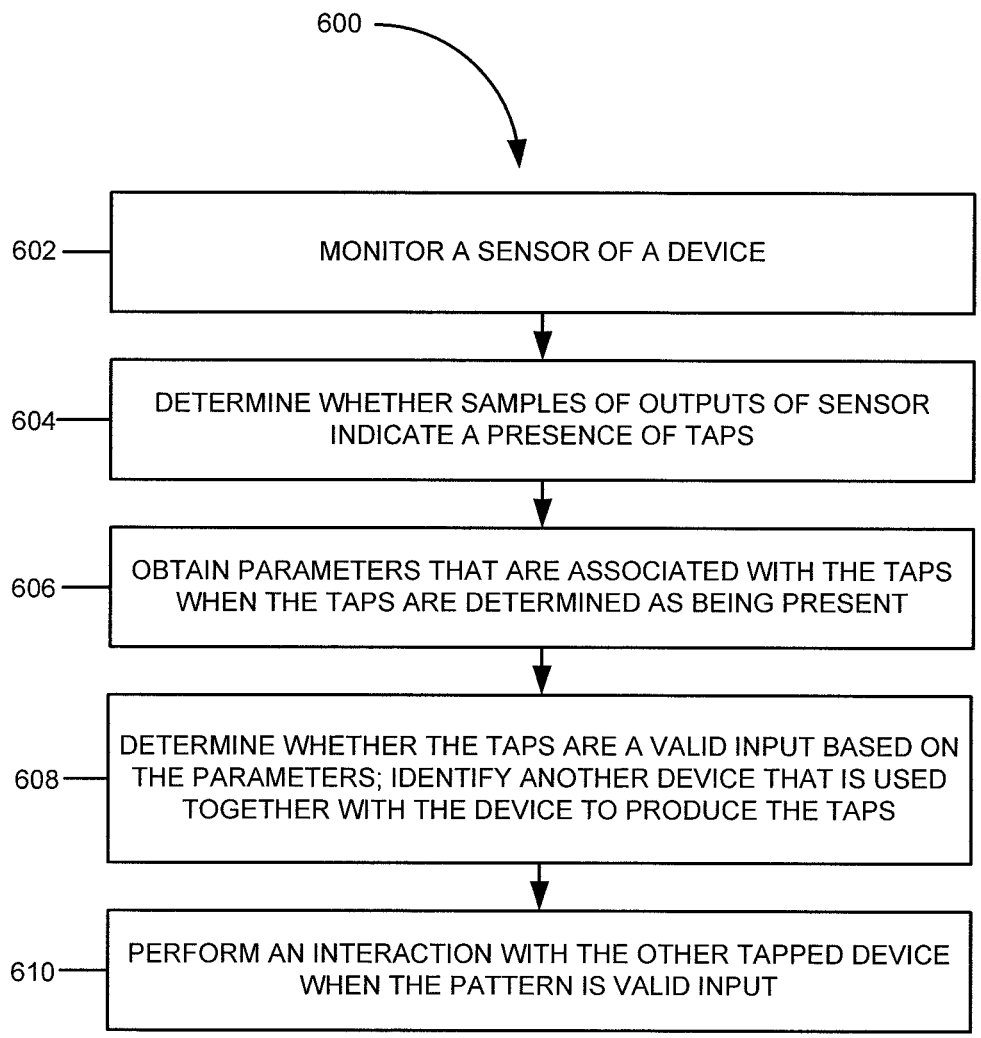
FIG. 6 is a flow diagram of an exemplary process for establishing communication between and interacting with devices based on device-to-device contacts.

Exemplary Process for Interacting with Devices
Based on Physical Device-to-Device Contact FIG. 6 shows an exemplary process 600 for establishing communication between and interacting with various devices based on device-to-device contact. Process 600 may begin at block 602, where sensor 412 of device 102-1 may be monitored (block 602). Monitoring sensor 412 may entail processing unit 404 sampling outputs of sensor 412. In one implementation, sensor 412 may begin to monitor device 102-1 for taps when one of control buttons 306 or a key on keypad 308 is pressed. Such an implementation may facilitate saving power.

Figure 7:
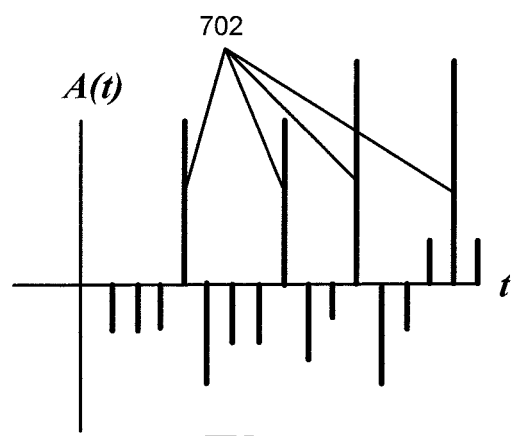
FIG. 7 illustrates an output of a sensor of FIG. 4.

FIG. 7 shows outputs of sensor 412 when sensor 412 is implemented as an accelerometer. As shown, each of local peaks 702 may indicate a sudden change in acceleration of device 102-1, and therefore, may indicate a potential tap.

It may be determined whether samples of outputs of sensor 412 indicate a presence of taps (block 604). In one implementation, database 504 may store reference output patterns of sensor 412 of device 102-1 when device 102-1 is tapped. The patterns may be compared against the samples, and if the samples match one or more of the patterns, tap detector 506 may determine that device 102-1 is tapped. In another implementation, tap detector 506 may perform a test on the samples (e.g., determine if one or more peaks are greater than a threshold) to determine the presence of one or more taps. In a different implementation, a tap may be detected by sensor 412 (e.g., changes in acceleration), and subsequently, device 102-1 may monitor sensor 412 for another tap within a particular amount of time (e.g., 2 seconds). If no tap is detected, device 102-1 may enter into an idle mode; otherwise process 600 may proceed to block 606.

When taps are determined as being present, parameters that are associated with the taps may be obtained (block 606). The parameters may include the number of taps, time between consecutive taps, physical locations of the taps on housing 316 of device 102-1, time at which each tap occurs, the orientation of device 102-1, etc. If sensor 412 includes an accelerometer, the locations of the taps may be determined based on the direction of acceleration of device 102-1 during the taps. Alternatively, if sensor 412 is implemented as an electric field sensor, sensor 412 may determine and output the locations of the taps. In another implementation, specific portions of housing 316 may be coupled to a contact-sensor, and each portion may be associated with a physical location on the surface of housing 316. In such an implementation, detecting taps on one of the portions may indicate the locations of the taps. In some implementations, a gyroscope/magnetometer may be included to obtain the orientation of device 102-1 as one of the parameters.

Whether the taps are a valid input may be determined based on the parameters (block 608). When the taps correspond to a valid input, another device that is used together with the device to produce the taps may be identified (block 608). Depending on the implementation, block 608 may be performed in a number of ways. For example, in one implementation, tap detector 506 may communicate with all nearby devices to determine which device has been recently tapped. Consequently, each of the nearby devices may determine whether it has been tapped in a similar manner to that described above with respect to device 102-1. If a nearby device has been tapped, the nearby device may transmit parameters (e.g., time between two consecutive taps) that characterize its own taps to device 102-1. Tap detector 506 in device 102-1 may compare the received parameters to the parameters that are obtained at block 606. If they match, tap detector 506 may conclude that the taps represent valid user input and identify the nearby device as the other device that has been used to produce the taps.

In a different implementation, device 102-1 may broadcast the parameters and/or tap patterns to nearby tap-enabled devices. Each of the nearby tap-enabled devices may attempt to match the received parameters and/or the tap patterns to its own parameters and/or tap patterns. If there is a match, the nearby device may communicate with device 102-1 to identify itself and to indicate that the taps are valid user input. For example, the nearby device may signal device 102-1 with one or more beeps (e.g., two beeps) indicating a pairing of the two devices.

In different implementations, either device 102-1 or the nearby device may initiate the determination whether the taps are valid input and/or identify itself to the other device.

In one implementation, matching the parameters may involve matching the physical locations of the taps on device 102-1 and on other devices. For example, assume that device 102-1 is tapped simultaneously by two or three nearby devices. In such an implementation, a user may indicate which of the nearby devices may receive what information from device 102-1 by tapping device 102-1 with each of the nearby devices on predetermined locations of housing 316. For example, the user may tap device 102-1 with a device that is to operate as a right speaker on the right side of housing 316 of device 102-1.

In the above implementations, validating the taps as user input may involve establishing a communication between device 102-1 and other devices via a wireless network (e.g., piconet). In one implementation, when the taps are detected, device 102-1 and another device may connect via Bluetooth or WiFi, search for a temporary, unique network identifier (e.g., a name configured using an encryption algorithm in both devices), and use one of the parameters (e.g., time between two consecutive taps) as a unique password/key to establish a connection with one another. Once a communication is established, device 102-1 and the other device may retake their original device names or network identifiers.

Interaction with the other device may be performed (block 610). After device 102-1 determines that the taps are valid user input and identifies the other device used to produce the taps, tap-enabled application 508 in either device 102-1 or the other device may establish communication with one another. The interaction between the devices may depend on specifics of tap-enabled application 508 on device 102-1 and/or the other device, as illustrated in the examples described below.

In a different implementation, a process for establishing communication between and interacting with different devices based on taps may involve more than two devices. For example, in one implementation, devices 102-1 and 102-2 may be used in conjunction with a laptop. Tapping each of two devices 102-1 and 102-2 to different sides of the laptop may enable devices 102-1 and 102-2 to operate as a right-hand speaker and a left-hand speaker for the laptop.

EXAMPLES

FIGS. 8A-8C, 9A-9C, 10A-10C, 11A-11B, 12A-12B, and 13A-13B illustrate processes involved interacting with various devices based on physical device-to-device contact. The example is consistent with exemplary process described above with respect to FIG. 6.

Figure 8A:
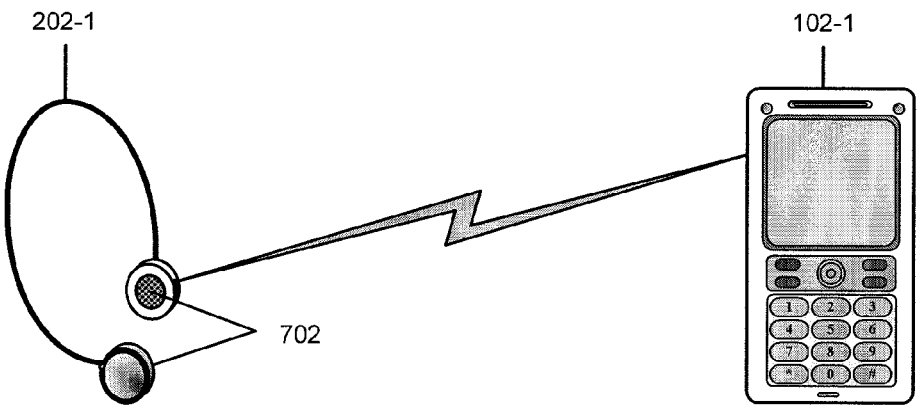
FIGS. 8A through 8C illustrate using other exemplary devices in which concepts described herein may be implemented.
Figure 8B:
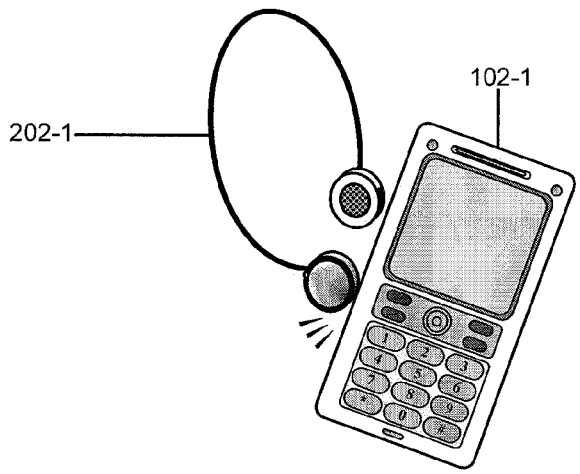
Figure 8C:
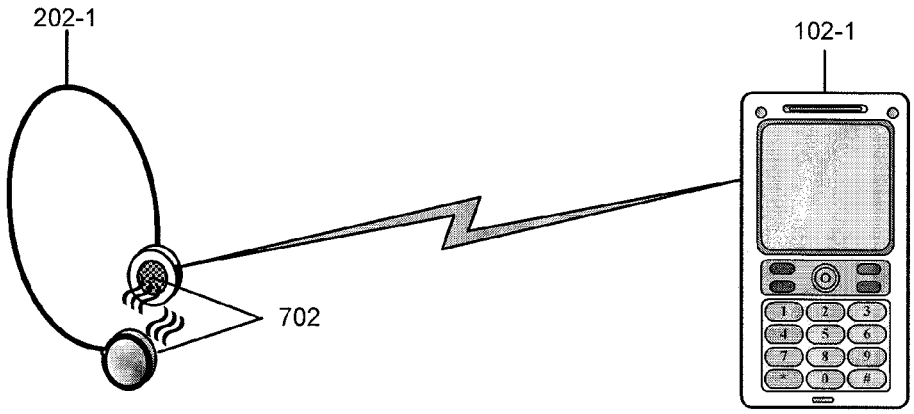

FIGS. 8A through 8C illustrate an example in which device 102-1 selects a peripheral for an audio output. In FIG. 8A, assume that acceleration of device 102-1 is being monitored via sensor 412. Signals from sensor 412 are used to determine if taps are present, and when, as illustrated in FIG. 8B, device 102-1 is tapped with headset 202-1, tap detector detects 506 the taps. Furthermore, parameters that are associated with the taps are obtained, and sent to headset 202-1. Headset 202-1 confirms that the taps are a valid input (e.g., matches the parameters to those related to taps that are detected by headset 202-1), and sends the confirmation to device 102-1. Upon receiving the confirmation, tap-enabled application 508 in device 102-1 channels an audio output to headset 202-1, which plays the audio output via speakers 702, as illustrated in FIG. 7C.

In the example, instead of selecting a particular peripheral based on a menu system, the user may select headset 202-1 to use with device 102-1 by simply tapping headset 202-1 to device 102-1.

Figure 9A:
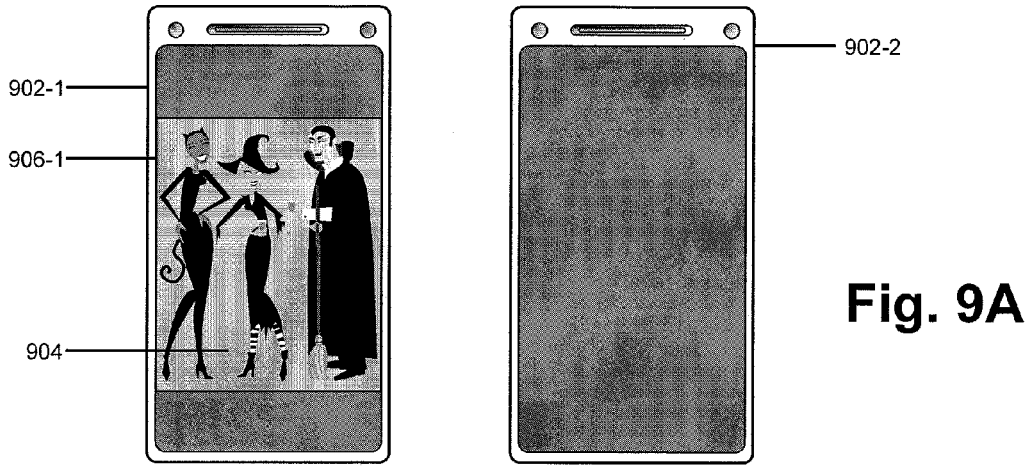
FIGS. 9A through 9C illustrate an example of interaction between devices based on physical device-to-device contact.
Figure 9B:
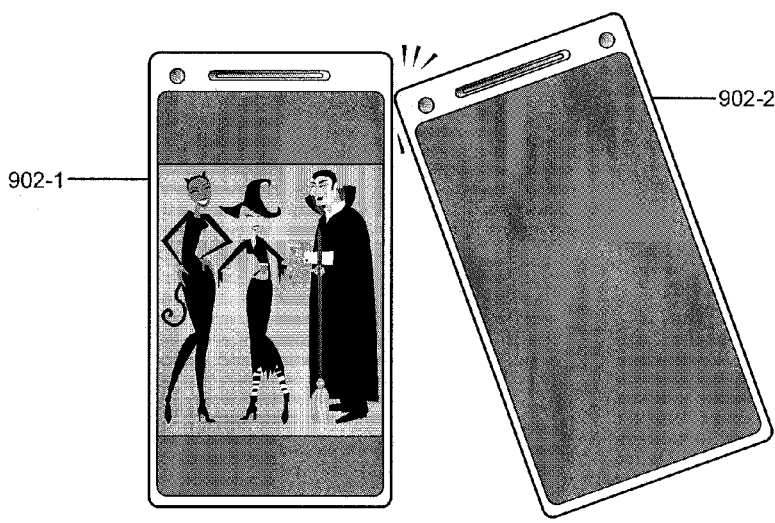
Figure 9C:
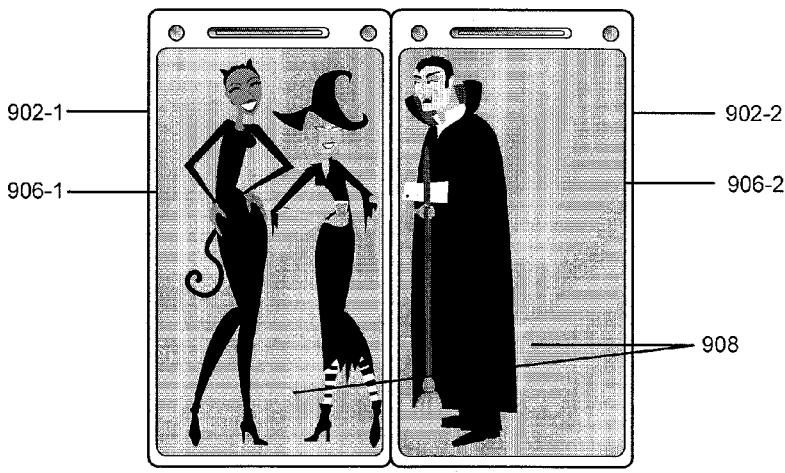

FIGS. 9A through 9C illustrate another example of interaction between devices based on physical device-to-device contact. As shown in FIG. 9A, the example involves a cellphone like devices 902-1 and 902-2, which are different implementations of device 102-1. In the example, device 902-1 shows a photograph 904 on display 906-1.

As shown in FIG. 9B, device 902-2 is tapped against device 902-1. When device 902-2 is tapped against device 902-1, device 902-1 confirms that the taps are valid user input and identifies device 902-2 as the device that has been used to produce the taps. Thereafter, tap-enabled application 508 in device 902-1 uses display screen 906-1 on device 902-1 and display screen on 906-2 on device 902-2 to show enlarged picture 908 that expands the original image to span portions of both screens 906-1 and 906-2.

Figure 10A:
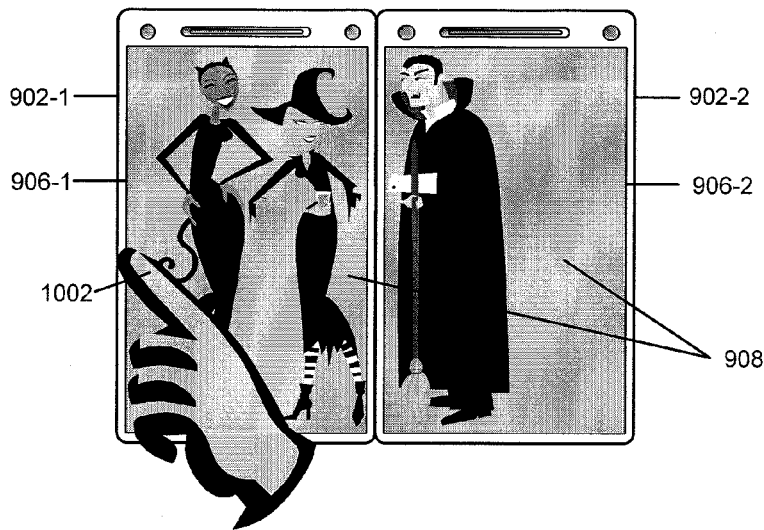
FIG. 10A through 10C illustrates another example of interaction between devices based on physical device-to-device contact.
Figure 10B:
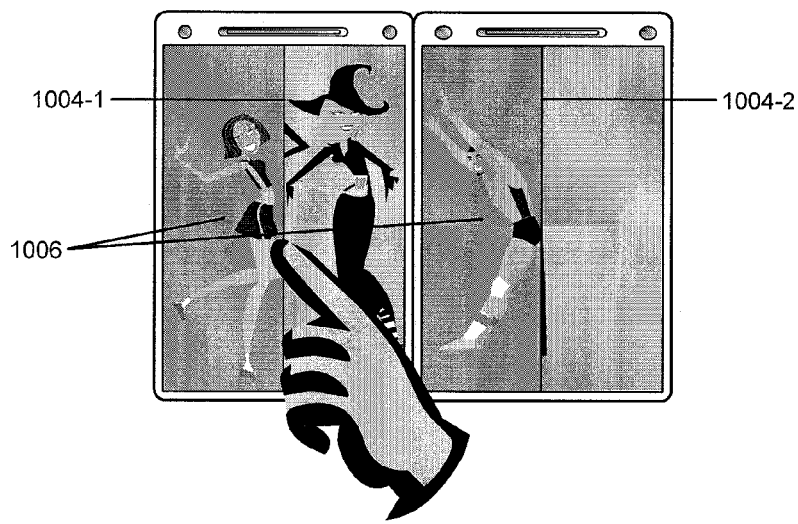
Figure 10C:
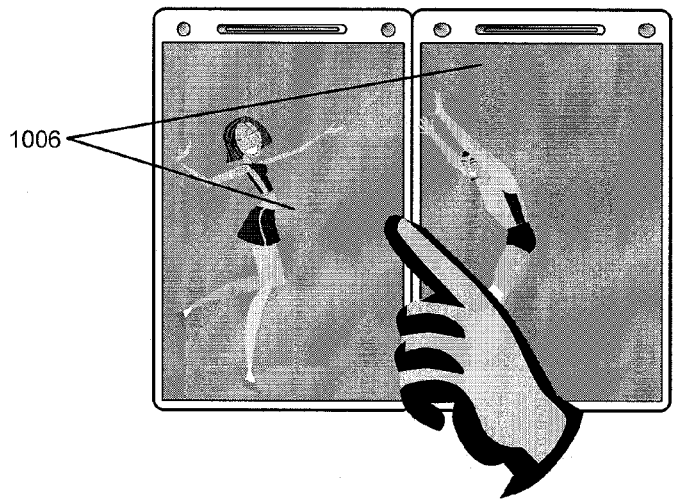

FIG. 10A through 10C illustrates yet another example of interaction between devices based on physical device-to-device contact. As shown in FIG. 10A, devices 902-1 and 902-2 show picture 908 on displays 906-1 and 906-2. Assume that a user wishes to switch from picture 908 to a second picture. To switch from picture 908 to another picture, the user places a finger 1002 on a side edge of display 906-1.

As shown in FIG. 10B, the user then sweeps finger 1002 across the surface of display 906-1 from the side edge toward the center of display 906-1. As finger 1002 sweeps the surface of display 906-1, a line 1004-1 at the side edge follows the finger to the position illustrated in FIG. 10B, revealing a portion of picture 1006. In addition, tap-enabled application 508 sends information related to finger 1002 and line 1004-1 to device 902-2, which causes line 1004-2 in display 904-2 to track line 1004-1. Movement of line 1004-2 reveals a different portion of picture 1006 on display 906-2.

FIG. 10C illustrates display 906-1 and 906-2 when finger 1002 completes its sweep across display 906-1. As illustrated, displays 906-1 and 906-2 show picture 1006.

Figure 11A:
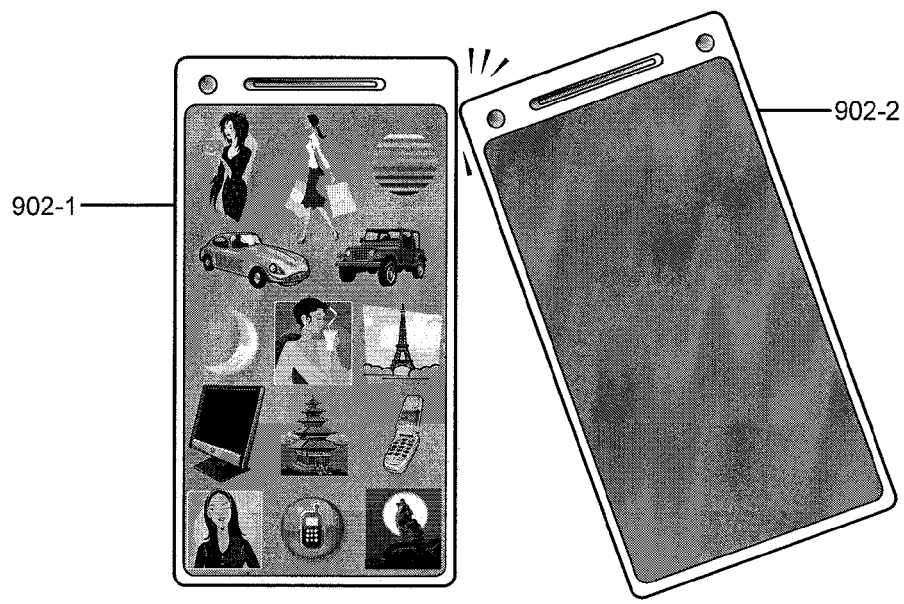
FIGS. 11A and 11B illustrate yet another example of interaction between devices based on physical device-to-device contact.
Figure 11B:
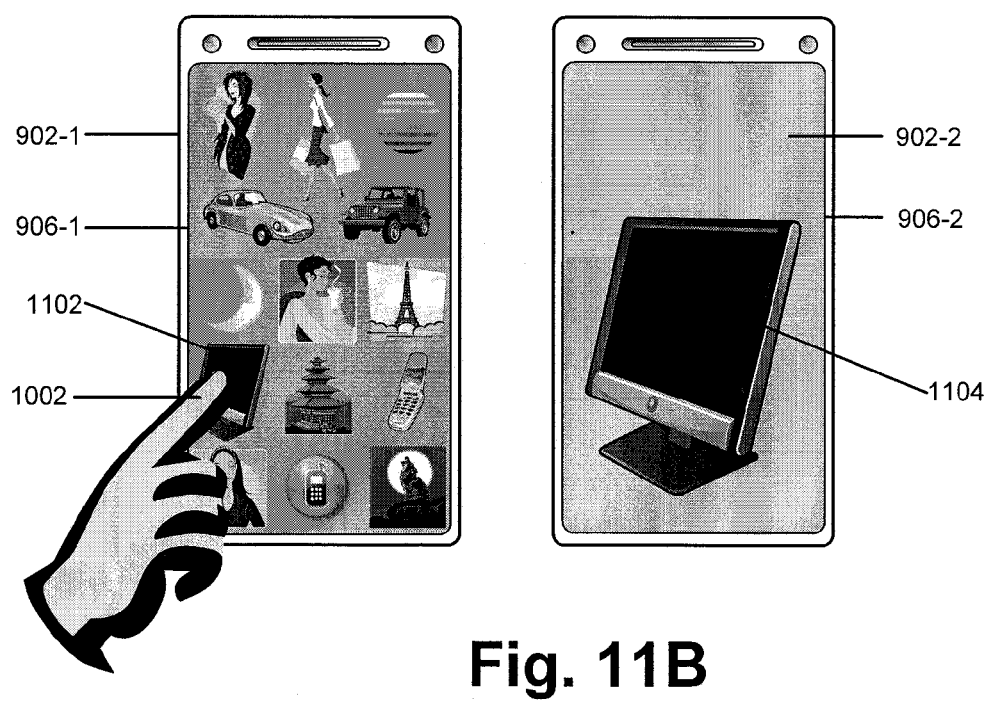

FIGS. 11A and 11B illustrate yet another example of interaction between devices based on physical device-to-device contact. As illustrated in FIG. 11A, the example involves devices 902-1 and 902-2. In addition, display 906-1 of device 902-1 shows a screen full of thumbnail images in accordance with another implementation of tap-enabled application 508. In the example, devices 902-1 and 902-2 are tapped together, as in the previous examples.

When device 902-2 is tapped against device 902-1, device 902-1 confirms that the taps are valid user input and identifies device 902-2 as the device that has been used to produce the taps. Subsequently, when the user touches a thumbnail image 1102 with finger 1002 as shown in FIG. 11B, tap-enabled application 508 sends another image 1104 related to thumbnail image 1102 to device 902-2. Device 902-2 displays image 1104. In a different implementation, device 902-2 may access image 1104 from its own memory 402 or from a network.

Figure 12A:
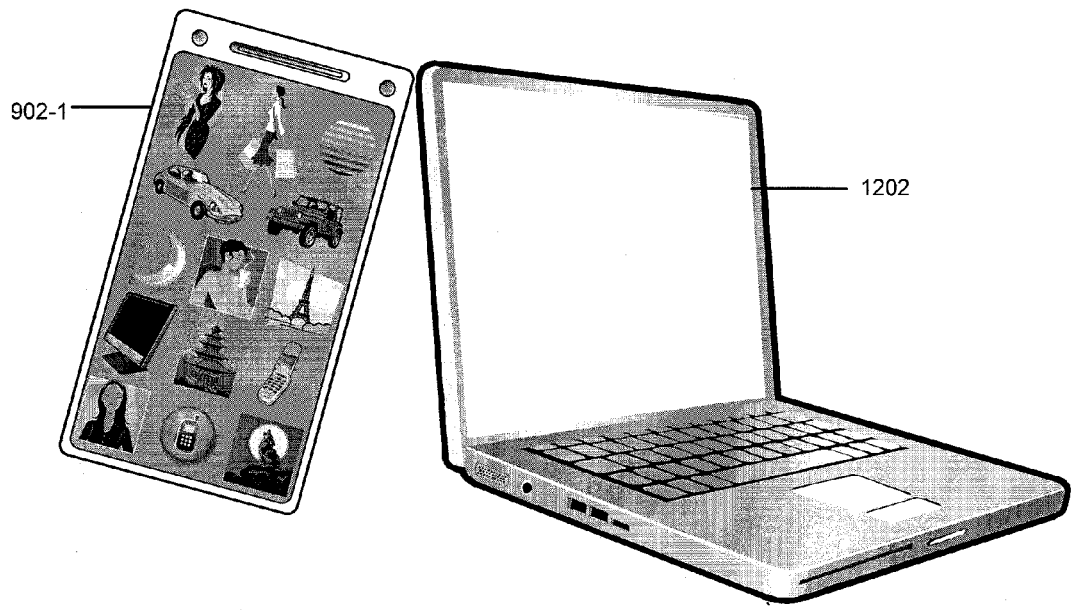
FIGS. 12A and 12B illustrate still another example of interaction between devices based on physical device-to-device contact.
Figure 12B:
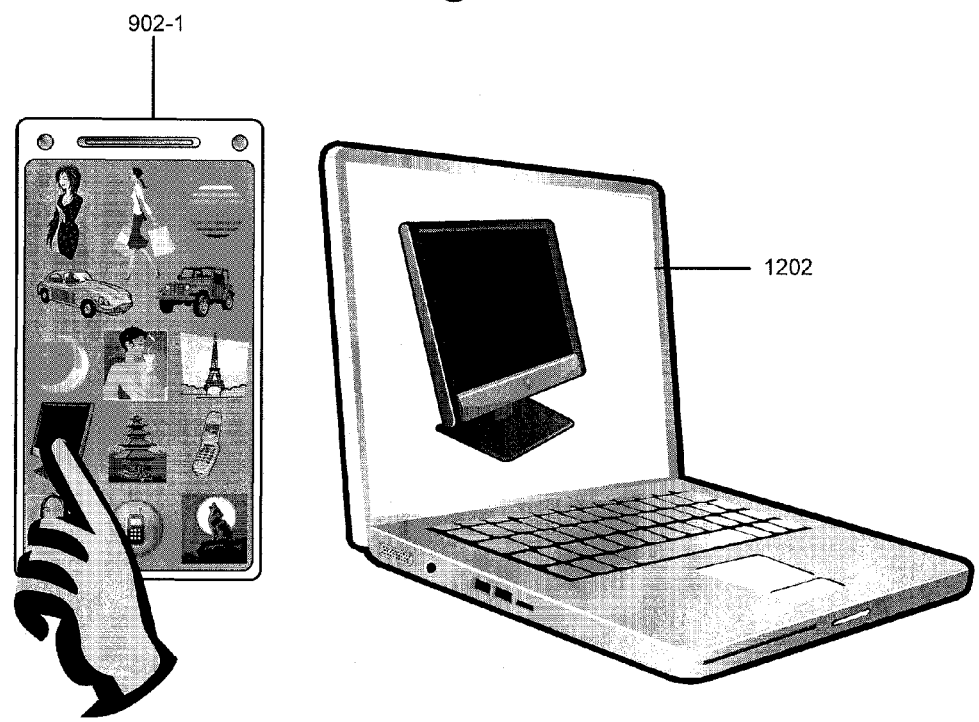

FIGS. 12A and 12B illustrate yet another example of interaction between devices based on physical device-to-device contact. The example is similar to the example illustrated by FIGS. 11A and 11B, except that, in place of device 902-2, device 1202 (e.g., a laptop) is used.

Figure 13A:
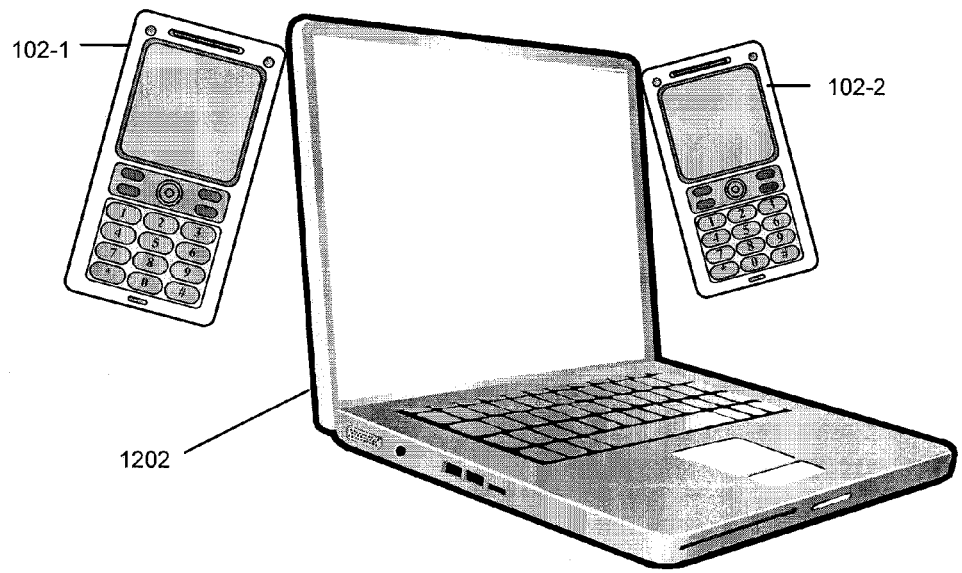
FIGS. 13A and 13B illustrate still another example of interaction between devices based physical device to-device contact.
Figure 13B:
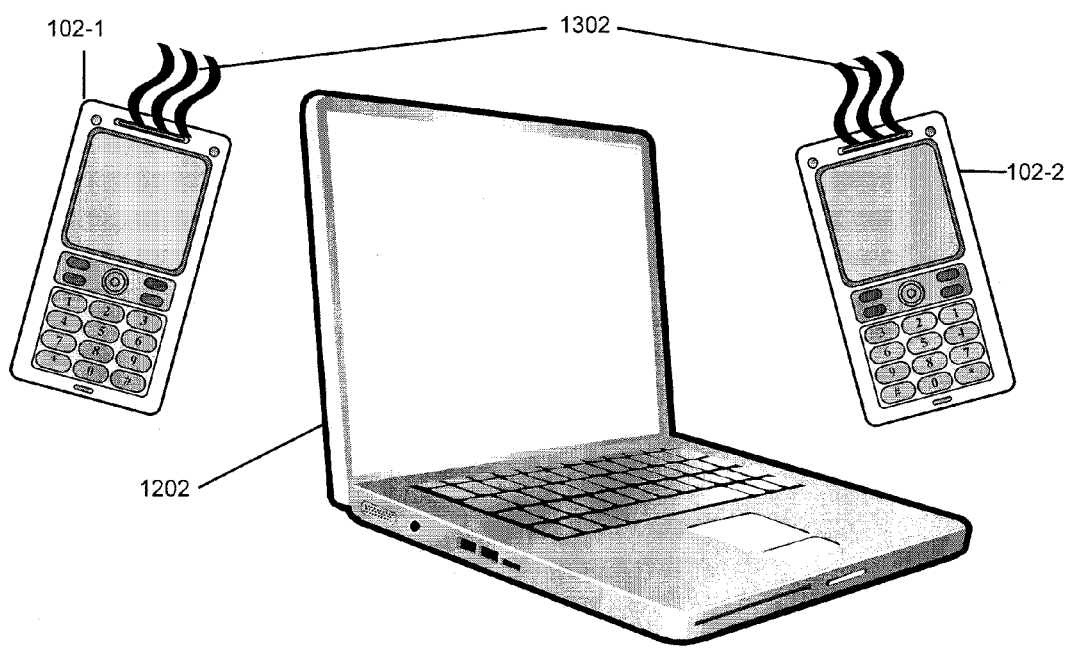

FIGS. 13A and 13B illustrate still another example of interaction between devices based on physical device to-device contact. As shown in FIG. 13A, devices 102-1 and 102-2 are tapped against device 1202, whose tap-enabled application 508 is playing music. When devices 102-1 and 102-2 are tapped against device 1202, a process similar to those described above for different examples is performed. In addition, device 1202 sends each of audio signals that are associated with stereo sound to devices 102-1 and 102-2, respectively. Devices 102-1 and 102-2 may then act as left and right speakers for device 1202. Depending on the implementation, devices 102-1 and 102-1 may play the audio signals within a particular amount of time after the taps (e.g., 1 second after the taps). In some implementations, devices 102-1, 102-1, and 1202 may show coordinated music visualization graphics (e.g., waves).

The above example shows that causing a device to communicate with another device and/or interact with the other device based on taps may be convenient (e.g., there is no need for a user to navigate through a menu system on display 304), safe, (e.g., a communication link between the devices is not exposed to computer virus, spam, and/or other unwanted network data/messages until the taps are detected), and/or economical (e.g., no need to expend energy on maintaining a communication link until taps are detected).

CONCLUSION

The foregoing description of implementations provides illustration, but is not intended to be exhaustive or to limit the implementations to the precise form disclosed. Modifications and variations are possible in light of the above teachings or may be acquired from practice of the teachings.

For example, while a series of blocks has been described with regard to an exemplary process illustrated in FIG. 6, the order of the blocks may be modified in other implementations. In addition, non-dependent blocks may represent acts that can be performed in parallel to other blocks.

In yet another example, tap-enabled application 508 may send different types of information to tapped devices, such as information related to transferring electronic payment/cash, coupons, contact information, images, pieces of music (e.g., songs), text, etc. In some implementations, specific location of the taps may determine what information is transferred. For example, if device 102-1 is tapped on a side, device 102-1 may send a picture, and if device 102-1 is tapped on the top near speaker 302, device 102-1 may share a song with another device.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

It should be emphasized that the term "comprises/comprising" when used in this specification is taken to specify the presence of stated features, integers, steps or components but does not preclude the presence or addition of one or more other features, integers, steps, components, or groups thereof.

Further, certain portions of the implementations have been described as "logic" that performs one or more functions. This logic may include hardware, such as a processor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" is intended to include one or more items. Where one item is intended, the term "one" or similar language is used. Further, the phrase "based on" is intended to mean "based, at least in part, on" unless explicitly stated otherwise.

What is claimed is:

1. A method comprising:
receiving a signal corresponding to one or more taps on the first device against a second device from a sensor coupled to a first device;
comparing the received signal with predetermined signal patterns;
identifying an application specific action associated with one of the predetermined signal patterns based on a result of the comparison;
determining whether the first device is tapped one or more times against the second device based on the result of the comparison;
broadcasting information regarding the one or more taps when it is determined that the first device has been tapped one or more times against the second device;
receiving, from the second device, a response identifying the second device and indicating that the one or more taps are valid user input; and
performing the application specific action and interacting with the second device, when the one or more taps are valid user input.

2. The method of claim 1, where receiving a signal includes: receiving the signal from an accelerometer.

3. The method of claim 2, where comparing the received signal with predetermined signal patterns includes:
determining whether samples of the signal match a predetermined acceleration pattern.

4. The method of claim 1, where broadcasting information includes:
obtaining parameters regarding the one or more taps; and
broadcasting the parameters.

5. The method of claim 4, where obtaining parameters includes:
obtaining locations of the one or more taps on a surface of the first device;
determining time between two consecutive taps; or
determining time of occurrence of at least one of the one or more taps.

6. The method of claim 4, where
the response indicates whether the broadcast parameters match parameters that are obtained from one or more taps on the second device.

7. The method of claim 1, where receiving a response includes:
receiving parameters associated with one or more taps on the second device in response to the information;
determining if the received parameters match parameters that are extracted from the signal when the first device is tapped one or more times against the second device; and
determining whether the one or more taps are valid by comparing the received parameters to the extracted parameters.

8. The method of claim 1, where performing the application specific action includes:
coordinating at least one of an audio task or a visual task with the second device.

9. The method of claim 1, where performing the application specific action includes one of:
sending an audio signal to the second device for output by a speaker; or
sending a video signal to the second device for display.

10. The method of claim 1, where performing the application specific action includes at least one of:
receiving personal contact information from the second device;
conducting a commercial transaction with the second device; or
receiving a video clip, audio clip, image, or text from the second device.

11. A device comprising:
a sensor; and
a processor configured to:
- receive a signal corresponding to one or more taps on the device against a second device from the sensor;
- detect taps based on the signal;
- compare the received signal with predetermined signal patterns;
- identify an application specific action associated with one of the predetermined signal patterns based on a result of the comparison;
- extract parameters that are associated with the detected taps;
- send a request to the second device to verify if the extracted parameters match parameters that correspond to taps on the second device;
- determine if the detected taps are valid user input based on a response from the second device; and perform the application specific action, interacting with the second device when the one or more taps are determined as being valid user input and it is verified that the extracted parameters match parameters that correspond to taps on the second device.

12. The device of claim 11, where the parameters include at least one of:
time between consecutive taps; or
time of occurrence of a tap.

13. The device of claim 11, where the sensor includes at least one of:
an accelerometer; or
an electric field sensor.

14. The device of claim 11, where the second device includes at least one of:
a cell phone with a display or a speaker;
a headset; or
a laptop.

15. The device of claim 11, where the device comprises:
a cell phone.

16. The device of claim 11, where the communication channel includes:
a Bluetooth communication channel.

17. The device of claim 11, where the request includes the extracted parameters and the response includes information that indicates whether the extracted parameters match parameters that correspond to taps on the second device.

18. The device of claim 11, where the response includes parameters that are obtained from taps by the second device.

19. A device comprising:
- means for sensing an acceleration of the device and outputting acceleration values;
- means for receiving the acceleration values from the means for sensing the acceleration;
- means for detecting taps that are produced by a first device and a second device based on the acceleration values;
- means for broadcasting information regarding the taps when the taps are detected;
- means for comparing the acceleration values with predetermined acceleration patterns;
- means for receiving, from the second device, a response identifying the second device and indicating that the one or more taps are valid user input; and
- means for performing the application specific action corresponding to the one or more taps and interacting with the second device, when the one or more taps are determined as being valid user input.

20. The device of claim 19, where the information includes:
time of occurrence of at least one of the detected taps.

* * * * *